US010051316B2

(12) United States Patent
Shimofure et al.

(10) Patent No.: US 10,051,316 B2
(45) Date of Patent: Aug. 14, 2018

(54) DECODING DEVICE, RECEPTION DEVICE, TRANSMISSION DEVICE, TRANSMISSION/RECEPTION SYSTEM, DECODING METHOD, AND STORAGE MEDIUM HAVING DECODING PROGRAM STORED THEREIN

(71) Applicant: NEC CORPORATION, Tokyo (JP)

(72) Inventors: Kensuke Shimofure, Tokyo (JP); Yasuhisa Nakata, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/550,043

(22) PCT Filed: Feb. 18, 2016

(86) PCT No.: PCT/JP2016/000874
§ 371 (c)(1),
(2) Date: Aug. 10, 2017

(87) PCT Pub. No.: WO2016/139908
PCT Pub. Date: Sep. 9, 2016

(65) Prior Publication Data
US 2018/0027285 A1    Jan. 25, 2018

(30) Foreign Application Priority Data

Mar. 2, 2015 (JP) ................................. 2015-040456

(51) Int. Cl.
*H04N 21/434* (2011.01)
*H04N 5/44* (2011.01)
(52) U.S. Cl.
CPC ....... *H04N 21/4341* (2013.01); *H04N 5/4401* (2013.01)

(58) Field of Classification Search
CPC .................................................... H04N 5/4401
See application file for complete search history.

(56) References Cited

U.S. PATENT DOCUMENTS

| 2002/0016970 A1* | 2/2002 | Negishi | .................. H04N 5/783 725/88 |
| 2008/0066142 A1* | 3/2008 | Kim | .................. H04N 5/44513 725/141 |

FOREIGN PATENT DOCUMENTS

| JP | 2010-272071 A | 12/2010 |
| WO | 2014/196189 A1 | 12/2014 |

OTHER PUBLICATIONS

"MMT-Based Media Transport Scheme in Digital Broadcasting Systems, Version 1.1", Association of Radio Industries and Businesses, [online], Dec. 2014, 299 pgs.
(Continued)

*Primary Examiner* — Michael Teitelbaum
(74) *Attorney, Agent, or Firm* — Sughrue Mion, PLLC

(57) ABSTRACT

[Problem] To provide: a decoding device that decodes and replays, at a suitable timing, sequentially transmitted information; a reception device; a transmission device; a transmission/reception system; a decoding method; and a storage medium having a decoding program stored therein. [Solution] A decoding unit 21 that decodes packets sent from a transmission device 10. A decoding timing determination unit 22 determines the timing that the decoding unit 21 decodes packets, on the basis of adjustment information that is included in the packet and corresponds to time adjustment for making Coordinated Universal Time approach Universal Time. A packet includes processing interval information indicating the processing interval for an access unit being a set including the packet. The decoding timing determination unit 22 determines that packets constituting each access unit will be sequentially decoded at an interval corresponding to
(Continued)

the interval indicated by the processing interval information, if the adjustment information indicates that a time adjustment will occur.

7 Claims, 12 Drawing Sheets

(56) References Cited

OTHER PUBLICATIONS

Yuki Kawamura, et al., "Prototyping and Verification of an MMT Transport System for 8K SHV Broadcasting", The Institute of Image Information and Television Engineers, Aug. 10, 2014, 2 pgs.
International Search Report for PCT/JP2016/000874 dated May 24, 2016 [PCT/ISA/210].
Written Opinion for PCT/JP2016/000874 dated May 24, 2016 [PCT/ISA/210].
International Preliminary Report on Patentability of PCT/JP2016/000874 [PCT/ISA/409].

* cited by examiner

DECODING DEVICE, RECEPTION DEVICE, TRANSMISSION DEVICE, TRANSMISSION/RECEPTION SYSTEM, DECODING METHOD, AND STORAGE MEDIUM HAVING DECODING PROGRAM STORED THEREIN

CROSS REFERENCE TO RELATED APPLICATIONS

This application is a National Stage of International Application No. PCT/JP2016/000874, filed on Feb. 18, 2016, which claims priority from Japanese Patent Application No. 2015-040456, filed on Mar. 2, 2015, the contents of all of which are incorporated herein by reference in their entirety.

TECHNICAL FIELD

The present invention relates to a decoding apparatus, a receiver, a transmitter, a transmission/reception system, a decoding method, and a storage medium storing a decoding program for transmission of encoded packets.

BACKGROUND ART

Digitization that changes signals transmitted/received in television broadcasting from analog signals to digital signals has proceeded around the world. In Japan, terrestrial digital broadcasting based on the ISDB-T (Integrated Services Digital Broadcasting-Terrestrial) scheme is performed.

In the terrestrial digital broadcasting based on the ISDB-T scheme, television program information including video information and audio information and data broadcast information (hereinafter, referred to as television program information and the like) are transmitted by radio waves to a large number of receivers. Further, also in satellite broadcasting and cable television broadcasting, similar information is transmitted. The receivers reproduce video and audio on the basis of the transmitted television program information and the like.

Further, for reasons of enhancing the quality of video and audio to be output to receivers, increasing the number of types, and the like, it has been investigated that a larger number of pieces of information are transmitted to receivers, and standardization of a new media transport scheme referred to as MMT (MPEG (Moving Picture Experts Group) Media Transport) has proceeded, as described in, for example, NPL 1.

In PTL 1, a method for appropriately decoding coded data in MMT is described.

CITATION LIST

Patent Literature

[PTL 1] International Publication WO2014/196189

Non Patent Literature

[NPL 1] "MMT-Based Media Transport Scheme in Digital Broadcasting Systems, Version 1.1", [online], December 2014, Association of Radio Industries and Businesses, [retrieved on Feb. 26, 2015], the Internet <URL:http://arib.or.jp/english/html/overview/doc/2-STD-B60v1_1.pdf>

SUMMARY OF INVENTION

Technical Problem

However, even when television program information and the like are transmitted by radio waves, it is difficult for a receiver to appropriately receive the television program information and the like in some cases due to changes in weather conditions or the like.

Therefore, in MMT, via a plurality of transmission paths referred to as a communication line and radio waves, television program information and the like are transmitted/received, and when it has been difficult to appropriately receive television program information and the like transmitted by radio waves, video and audio are reproduced on the basis of television program information and the like transmitted via a communication line. To perform reproduction in such a manner, it is necessary for the receiver to decode and reproduce the television program information and the like transmitted via the communication line and the television program information and the like transmitted by radio waves at appropriate timings.

Here, a broadcaster generates time information so that a receiver can perform reproduction at appropriate timings on the basis of a time stamp of NTP (Network Time Protocol) and transmits the generated time information by being associated with television program information and the like. Now, the time stamp of NTP refers to information indicating a time based on NTP. The receiver reproduces video and audio based on the television program information and the like at appropriate timings on the basis of a separately acquired time stamp of NTP and the time information associated with the television program information and the like.

The time stamp of NTP is based on Coordinated Universal Time. Coordinated Universal Time is adjusted to be made close to Universal Time once in several years. The adjustment is performed by inserting a leap second or eliminating a leap second. Specifically, when a leap second is inserted, a time stamp indicating, for example, eight fifty-nine and fifty nine seconds (hereinafter, referred to as "8:59:59" or the like) is generated twice continuously. Further, when a leap second is eliminated, a time stamp indicating the next second of 8:59:58 is generated so as to indicate 9:00:00.

Then, in the method described in Patent Literature 1, when the adjustment is performed, it is difficult for a receiver to appropriately determine timings of reproducing video and audio based on transmitted television program information and the like. In Non Patent Literature 1, any response to the case in which the adjustment is performed is not disclosed.

Further, even when the adjustment is not performed, it is difficult that a receiver having received television program information and the like transmitted via a communication line and television program information and the like transmitted by radio waves reproduces video and audio by decoding these pieces of information at appropriate timings.

Furthermore, even in the case of not performing the adjustment, when a receiver receives television program information and the like in an order different from a transmission order upon transmitting the television program information and the like via a communication line, it is difficult that the receiver decodes and reproduces these pieces of information at appropriate timings.

Therefore, the present invention is intended to provide a decoding apparatus, a receiver, a transmitter, a transmission/ reception system, a decoding method, and a storage medium storing a decoding program for decoding pieces of information sequentially transmitted at appropriate timings.

Solution to Problem

A decoding apparatus according to an exemplary aspect of the present invention includes: a decoding unit for decoding packets transmitted from a transmitter; and a decode time determination unit for determining timings of decoding the packets by the decoding unit on the basis of adjustment information in accordance with adjustment of times for causing Coordinated Universal Time to be close to Universal Time, the times being included in the packets, wherein the packets include processing interval information that indicates a processing interval of access units that are sets including own packets, and the decode time determination unit determines to sequentially decode the packets configuring the respective access units at intervals in accordance with the interval indicated by the processing interval information when the adjustment information indicates that the times are adjusted.

A receiver according to an exemplary aspect of the present invention includes a decoding apparatus according to any one of aspects and a reception apparatus that receives packets.

A transmitter according to an exemplary aspect of the present invention includes, on a reception side, a transmission unit for transmitting packets including adjustment information in accordance with adjustment of times for causing Coordinated Universal Time to be close to Universal Time in order to decode packets in accordance with contents at predetermined timings and processing interval information that indicates a processing interval of access units that are sets including own packets.

A transmission/reception system according to an exemplary aspect of the present invention includes a receiver and a transmitter according to any one of aspects.

A decoding method according to an exemplary aspect of the present invention includes: a decoding step of decoding packets transmitted from a transmitter; and a decode time determination step of determining timings of decoding the packets in the decoding step on the basis of adjustment information in accordance with adjustment of times for causing Coordinated Universal Time to be close to Universal Time, the times being included in the packets, wherein the packets include processing interval information that indicates a processing interval of access units that are sets including own packets, and wherein the decode time determination step determining to sequentially decode the packets configuring the respective access units at intervals in accordance with the interval indicated by the processing interval information when the adjustment information indicates that the times are adjusted.

A storage medium according to an exemplary aspect of the present invention stores a decoding program that causes a computer to execute: decoding processing for decoding packets transmitted from a transmitter; and decode time determination processing for determining timings of decoding the packets in the decoding processing on the basis of adjustment information in accordance with adjustment of times for causing Coordinated Universal Time to be close to Universal Time, the times being included in the packets, wherein the packets include processing interval information that indicates a processing interval of access units that are sets including own packets, and wherein the decode time determination processing determines to sequentially decode the packets configuring the respective access units at intervals in accordance with the interval indicated by the processing interval information when the adjustment information indicates that the times are adjusted.

Advantageous Effects of Invention

According to the present invention, pieces of information sequentially transmitted can be decoded at appropriate timings.

DESCRIPTION OF EMBODIMENTS

A First Example Embodiment

Figure 1:
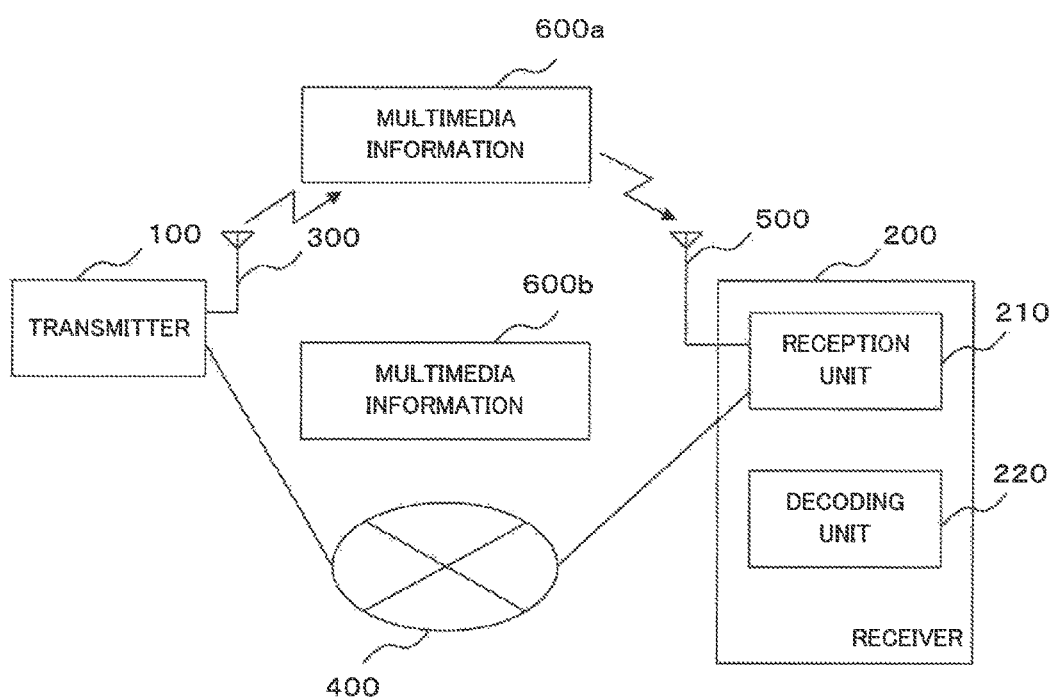
FIG. 1 is a block diagram illustrating a configuration example of a transmission/reception system of a first example embodiment of the present invention.

A transmission/reception system of a first example embodiment of the present invention will be described with reference to the accompanying drawings. FIG. 1 is a block diagram illustrating a configuration example of the transmission/reception system of the first example embodiment of the present invention. As illustrated in FIG. 1, the transmission/reception system of the first example embodiment of the present invention includes: a transmitter 100 that transmits information; and a receiver 200 that receives information. Hereinafter, the transmitter 100 and the receiver 200 may be realized by, for example, a computer such as a CPU (Central Processing Unit) or the like mounted with a single circuit or a plurality of circuits, the computer executing processing in accordance with program control. Specifically, the transmitter 100 and the receiver 200 are mounted with, for example, software for realizing respective operations described below. Further, the transmitter 100 and the receiver 200 may be configured to realize the respective operations described below by executing processing in accordance with program control of the software.

Hereinafter, description will be made, assuming that a leap second that is a time to be inserted or eliminated is one second, but the time may be shorter or longer than one second.

The transmitter 100 is installed by, for example, a broadcaster and transmits television program information and the like. The receiver 200 is installed by, for example, a viewer who views video and audio based on television program information and the like and receives the television program information and the like transmitted by the transmitter 100. Then, the receiver 200 presents (referred to also as reproduces or outputs) video and audio based on the received television program information and the like. Here, the video and audio presented in the receiver 200 include information of application software including a so-called app and various pieces of information such as captions, data, and the like. Now, an apparatus that receives information transmitted by the transmitter 100 and an apparatus that decodes the information received by the apparatus may be provided separately. Further, separately from the apparatus that decodes the information, an apparatus that presents video, audio, and the like based on the decoded information may be provided. In other words, means for realizing the respective operations described below may be apparatuses separate from each other.

As illustrated in FIG. 1, the transmitter 100 transmits multimedia information 600*a* by radio waves via an antenna 300. Further, the transmitter 100 transmits multimedia information 600*b* via a communication line (which may be a communication network such as the Internet or the like) 400. Here, the receiver 200 receives the multimedia information 600*a* via an antenna 500. Further, the receiver 200 receives the multimedia information 600*b* via the communication line 400. The pieces of multimedia information 600*a* and 600*b* each are information including television program information and the like, and details thereof will be described later.

Now, the receiver 200 includes, for example, a reception unit 210 that receives pieces of multimedia information 600*a* and 600*b* and a decoding unit 220 that executes decoding processing to be described later.

Pieces of multimedia information 600*a* and 600*b* transmitted/received between the transmitter 100 and the receiver 200 will be described below.

Figure 2:
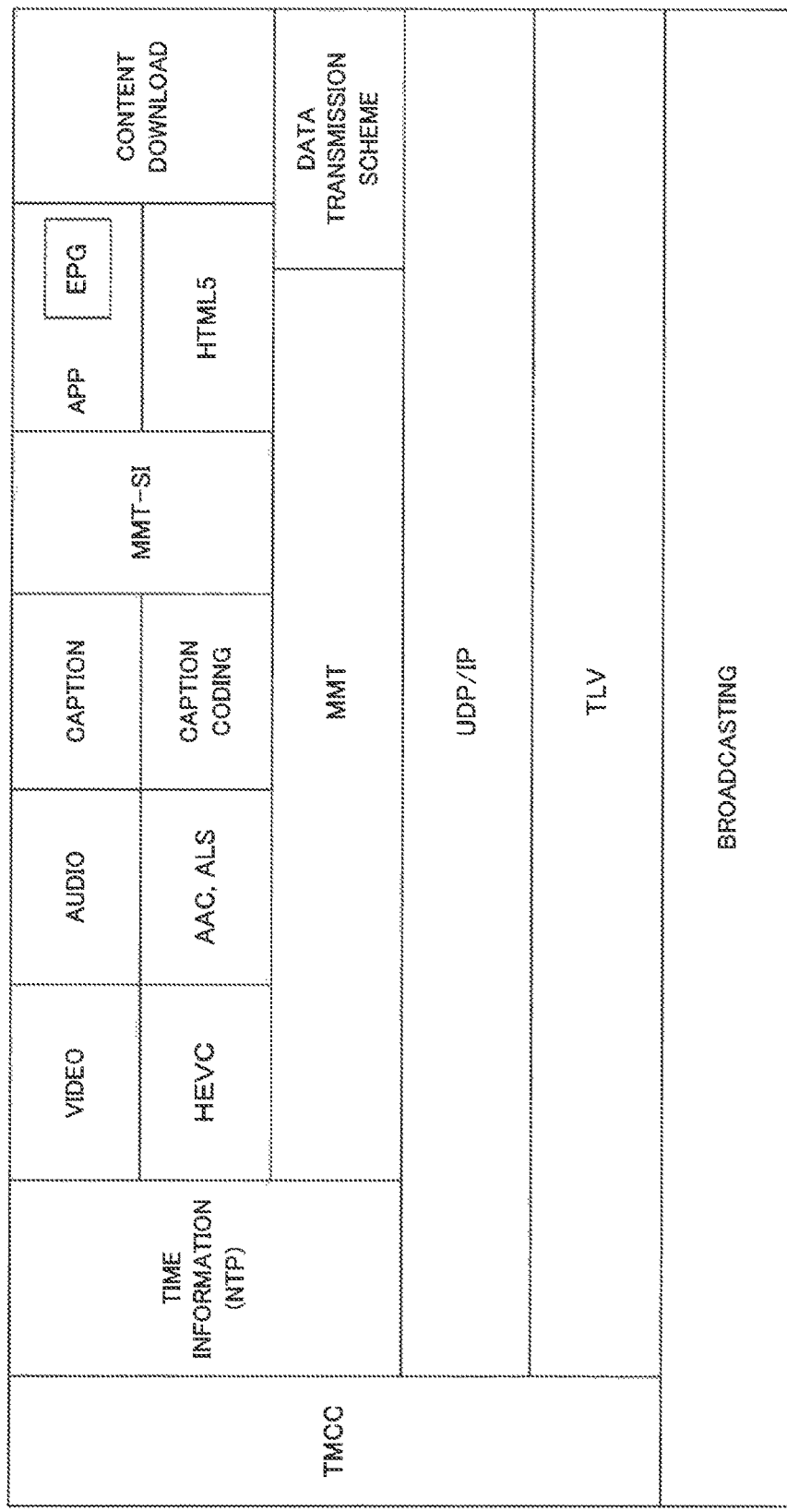
FIG. 2 is a protocol stack diagram illustrating a protocol configuration of multimedia information transmitted/received by radio waves.

FIG. 2 is a protocol stack diagram illustrating a protocol configuration of multimedia information 600*a* transmitted/received by radio waves. As illustrated in FIG. 2, the multimedia information 600*a* includes an IP (Internet Protocol) packet of the TLV (Type Length Value) packet format and TMCC (Transmission and Multiplexing Configuration and Control) that is a control signal.

Further, the IP packet of the TLV format (hereinafter, referred to also as the TLV packet) includes time information based on NTP and television program information and the like based on MMT.

Figure 3:
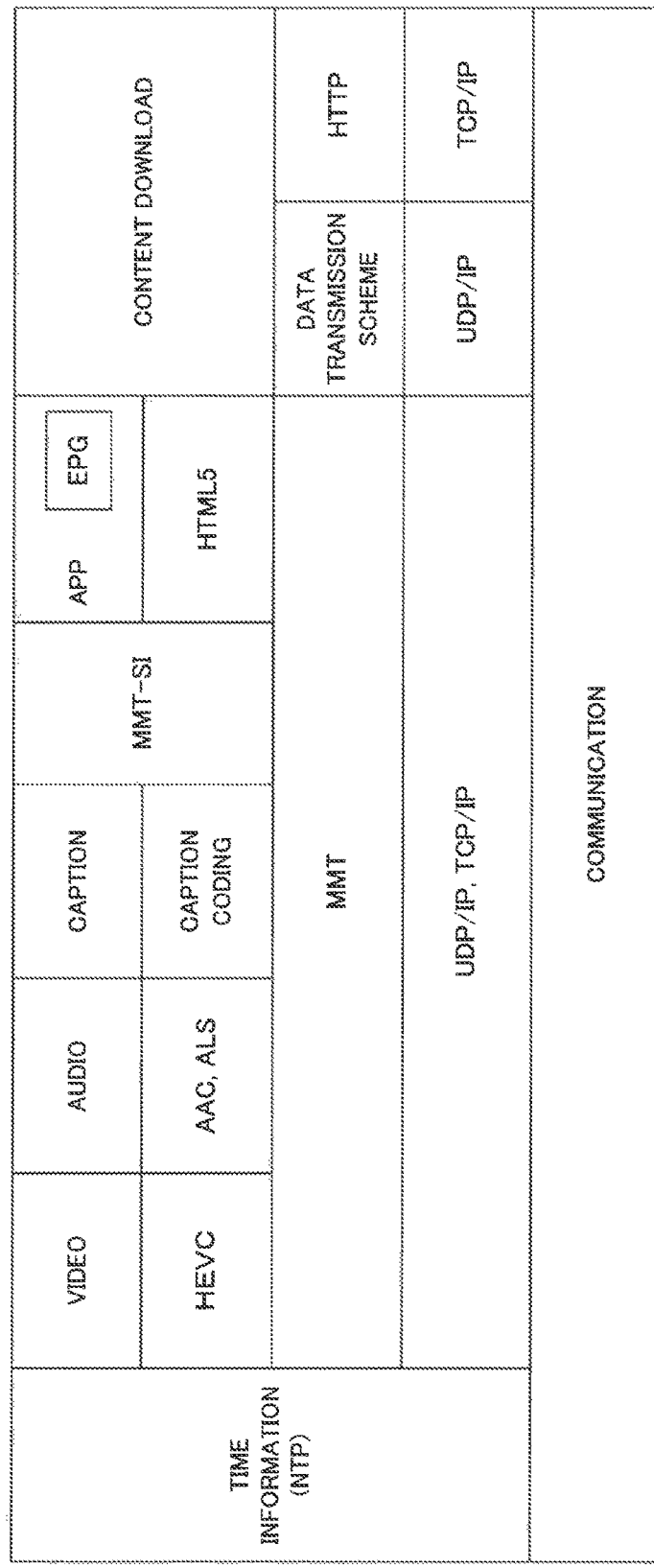
FIG. 3 is a protocol stack diagram illustrating a protocol configuration of multimedia information transmitted/received via a communication line.

FIG. 3 is a protocol stack diagram illustrating a protocol configuration of multimedia information 600*b* transmitted/received via the communication line 400. As illustrated in FIG. 3, the multimedia information 600*b* includes an IP packet in accordance with television program information and the like and time information based on NTP. Further, the IP packet includes television program information and the like based on MMT.

Video information and audio information of the television program information and the like included in the pieces of multimedia information 600*a* and 600*b* are described below. Here, the video information refers to information based on video signals. Further, the audio information refers to information based on audio signals. Furthermore, the transmitter 100 encodes video signals and audio signals and stores the coded signals in an MFU (Media Fragment Unit). Then, data for, for example, 1 GOP (Group Of Picture) based on a plurality of MFUs configures an MPU (Media Processing Unit), and the transmitter 100 stores MFUs in an MMTP (MMT Protocol) payload and transmits the MFUs as an IP packet by an MMTP packet. The video signals and the audio signals are converted into various types of formats by coding or packetization, but in the present example, information based on these video signals and information based on these audio signals to be changed to various types of formats will be collectively referred to as video information and audio information. Further, information including video information and audio information to be presented to a viewer will be referred to also as content information.

The MMTP packet includes a header portion referred to as an MMTP header and a payload portion referred to as an MMTP payload. The content information is included in the MMTP payload. The transmitter 100 generates an MMTP header including time stamp information that is information indicating a time based on an NTP counter.

Further, the MMTP payload stores MPU_presentation_time information that indicates a time (hereinafter, referred to as a presentation time) of causing the receiver 200 to output video and audio based on content information included in an MMTP packet including own information. The receiver 200 executes processing so as to output the video and audio based on the content information at the presentation time indicated by the MPU_presentation_time information. Here, the presentation time is expressed in an NTP time stamp format in this example, but the presentation time may be expressed in other format which can express the time.

The MMTP payload stores mpu_sequence_number information. The mpu_sequence_number information refers to information that indicates an mpu_sequence_number that is a sequence number assigned to identify each MPU from other MPUs for each same asset.

Further, the MMTP payload stores packet ID information. The packet ID information refers to information that indicates a packet ID for identifying, for example, an MMTP packet configuring one asset from an MMTP packet configuring another asset.

Here, for the time information, a flag in accordance with adjustment for causing Coordinated Universal Time to be close to Universal Time is prepared. Specifically, when, for example, a leap second is inserted, for time information transmitted during a predetermined period of time prior to the timing of timing of inserting the leap second, a leap second insertion flag in accordance with insertion of a leap second is set.

Further, when, for example, a leap second is eliminated, for time information transmitted during a predetermined period of time prior to the timing of eliminating the leap second, a leap second elimination flag in accordance with elimination of a leap second is set. Here, the predetermined period of time is, for example, one month. Further, the leap second insertion flag and the leap second elimination flag are equivalent to adjustment information. Furthermore, a timing of setting a flag, a reset timing, and a type of a flag to be set are not limited thereto, and a flag in accordance with another timing or another type may be used.

Figure 4:
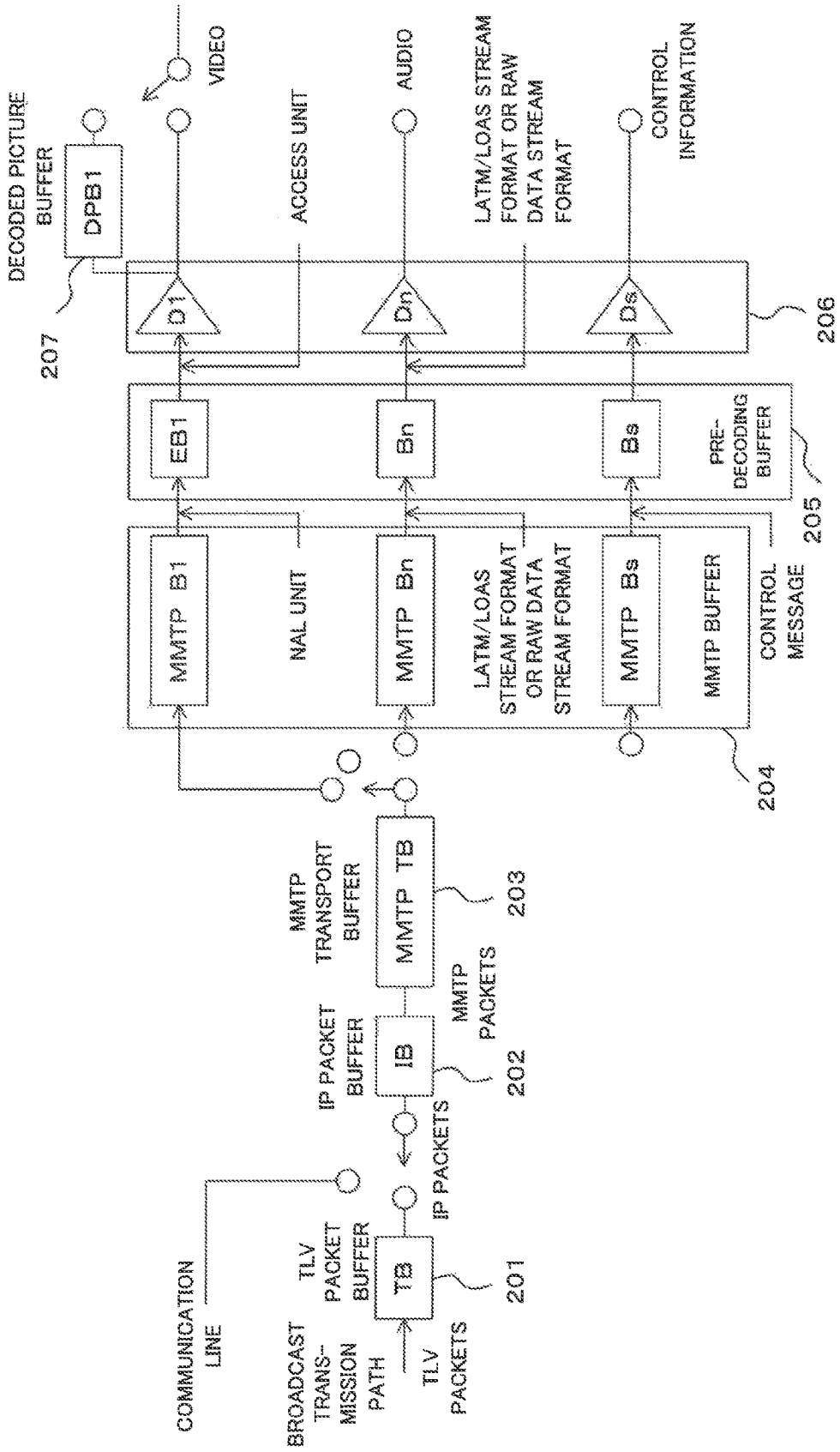
FIG. 4 is a block diagram illustrating a configuration example of a reception buffer in a receiver.

Next, a configuration of the receiver 200 will be described. FIG. 4 is a block diagram illustrating a configuration example of a reception buffer in the receiver 200.

In the example illustrated in FIG. 4, the reception buffer of the receiver 200 includes a TLV packet buffer 201, an IP packet buffer 202, an MMTP transport buffer 203, an MMTP buffer 204, a predecoding buffer 205, a decoder 206, and a decoded picture buffer 207.

A TLV packet extracted from multimedia information 600a transmitted by radio waves is input to the TLV packet buffer 201 and temporality stored therein.

An IP packet based on the TLV packet temporarily stored in the TLV packet buffer 201 is input to the IP packet buffer 202 and temporarily stored therein. Further, an IP packet of multimedia information 600b transmitted from the transmitter 100 is input to the IP packet buffer 202 via the communication line 400 and temporarily stored therein.

In the MMTP transport buffer 203, the IP packet, being changed to MMTP, temporarily stored in the IP packet buffer 202 is classified with respect to each asset such as video, audio, and the like on the basis of packet ID information included in an MMTP header. Then, the classified IP packets are input to the MMTP buffer 204 in accordance with the classification result.

In the example illustrated in FIG. 4, the MMTP buffer 204 includes MMTP B1, MMTP Bn, and MMTP Bs. Further, an IP packet of an asset for video is input to MMTP B1. Furthermore, an IP packet of an asset for audio is input to MMTP Bn. Moreover, an IP packet of an asset for a control message is input to MMTP Bs and temporarily stored therein.

The IP packet of an asset for video input to MMTP B1 is restored to data of an NAL (Network Abstraction Layer) unit and temporarily stored in MMTP B1.

The IP packet of an asset for audio input to MMTP Bn is restored to data of the LATM (Low-overhead MPEG-4 Audio Transport Multiplex)/LOAS (Low Overhead Audio Stream) format and temporarily stored in MMTP Bn. Herein, description is made, assuming that the IP packet of an asset for audio is restored to data of the LATM/LOAS format as one example, but a configuration may be made so that restoration to data of another format is performed.

Then, each piece of data and the control message temporarily stored in the MMTP buffer 204 are input to the predecoding buffer 205.

As illustrated in FIG. 4, the predecoding buffer 205 includes an elementary stream buffer EB1 for an elementary stream 1, a main buffer Bn for an elementary stream n, and a main buffer Bs for system information.

The data of the NAL unit temporarily stored in MMTP B1 is input to the elementary stream buffer EB1. Here, the elementary stream buffer EB1 is, for example, a CPB (Coded Picture Buffer).

The data of the LATM/LOAS format temporarily stored in MMTP Bn is input to the main buffer Bn and temporarily stored therein. Here, data of the Raw Data Stream format may be input to the main buffer Bn and temporarily stored therein.

The control message temporarily stored in MMTP Bs is input to the main buffer Bs and temporarily stored therein. Herein, description is made, assuming that data of the LATM/LOAS format as one example is restored to data of the Raw Data Stream format as one example, but a configuration may be made so that data of another format is restored to data of further another format.

Each piece of data and the control message input to the predecoding buffer 205 are output to the decoder 206 and decoded at a timing in accordance with a DTS (Decode Time Stamp), and temporarily stored. The DTS will be described later.

As illustrated in FIG. 4, the decoder 206 includes a video decoder D1, an audio decoder Dn, and a system decoder Ds.

The data output from the elementary stream buffer EB1 to the decoder 206 is decoded to video data by the video decoder D1. Then, the decoded video data is input, as needed, to the decoded picture buffer 207 and temporarily stored therein.

Further, the data output from the main buffer Bn to the decoder 206 is decoded to audio data by the audio decoder Dn.

Further, the control message output from the main buffer Bs to the decoder 206 is decoded to control information by the system decoder Ds. Furthermore, the control information is used to control each unit in the receiver 200.

The DTS (referred to also as the decode time) is described below. A presentation time and a decode time of video signals or audio signals are provided using an MPU time stamp descriptor and an MPU extended time stamp descriptor.

Figure 5:
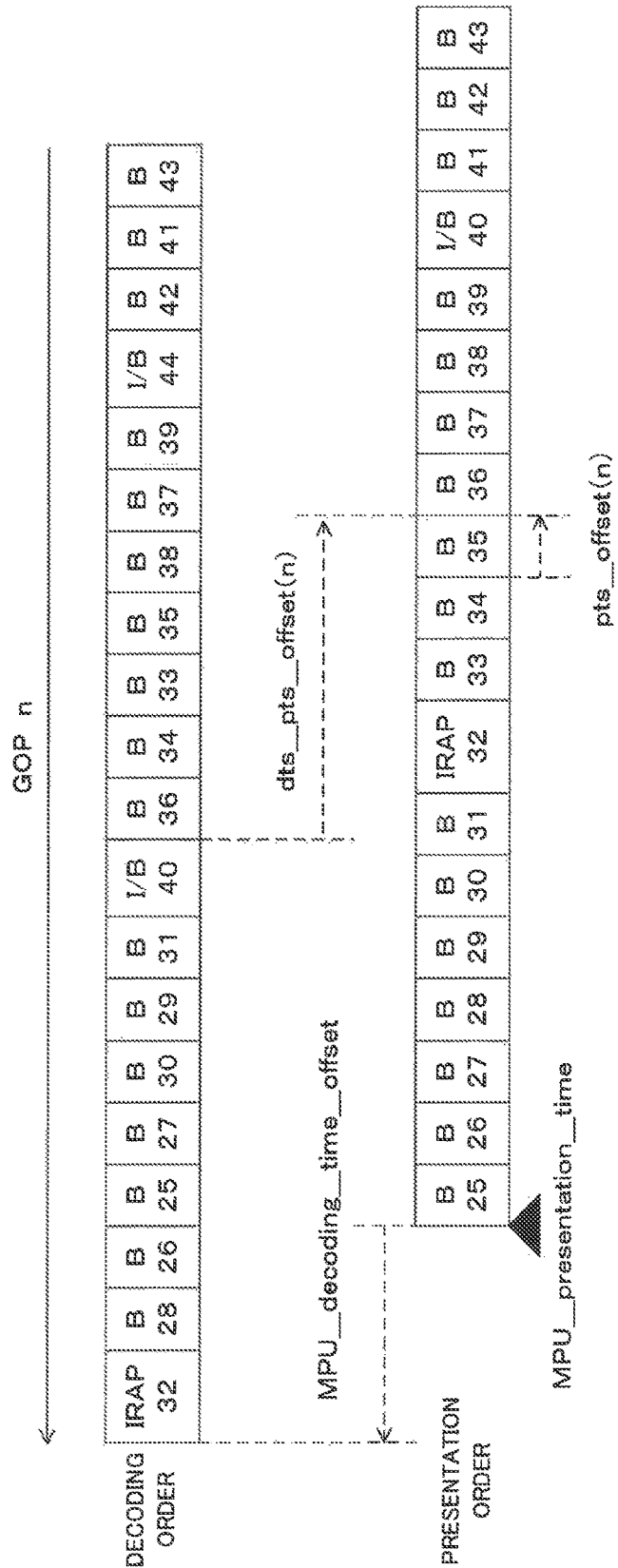
FIG. 5 is an illustrative diagram illustrating an outline of access units in an MPU, and presentation times and decoding times thereof.

FIG. 5 is an illustrative diagram illustrating an outline of access units in an MPU, and presentation times and decoding times thereof. FIG. 5 schematically illustrates bit streams configuring the MPU for respective access units that are units of the same presentation time. In the example illustrated in FIG. 5, a bit stream configuring each access unit configures a B frame and an I frame or a B frame (hereinafter, described as an I/B frame). Here, In FIG. 5, IRAP (Intra Random Access Point) refers to a bit stream at a timing when coding is started. Further, in the example illustrated in FIG. 5, an I/B frame is disposed at intervals of seven frames, and frames therebetween are B frames.

In the example illustrated in FIG. 5, each access unit is previously assigned with a number in a presentation order. In FIG. 5, using numbers assigned to "B," "I/B," and "IRAP," a presentation order of the respective access units is illustrated. Further, the example illustrated in the upper side of FIG. 5 illustrates that the respective access units have been decoded in an order different from the presentation order.

As described above, the MMTP payload stores MPU_presentation_time information. Using the MPU_presentation_time information, a presentation time of an access unit to be presented first in the MPU is indicated in the NTP time stamp format. Therefore, in FIG. 5, video based on a B frame of a 25th access unit is presented at a time indicated by the MPU_presentation_time information. Here, the MPU_presentation_time information is equivalent to presentation time information.

Further, a DTS of an nth access unit in an MPU is calculated by the following equation.

$$DTS(n) = MPU\_Presentation\_time - MPU\_decoding\_time\_offset/timescale + \Sigma pts\_offset(k)/timescale \quad (1)$$

wherein MPU_Presentation_time represents a time indicated in the NTP time stamp format by MPU_presentation_time information, MPU_decoding_time_offset represents a difference value between a decode time of an access unit decoded first and a presentation time of an access unit presented first, pts_offset represents a difference value between a presentation time of an immediately prior access unit and a presentation time of the current access unit in a presentation order in the same MPU, timescale represents a value indicating a unit of these times, and k represents a number of access units in the MPU. The pts_offset is equivalent to processing interval information.

Here, a PTS (Presentation Time Stamp) that is a presentation time of an nth access unit in an MPU is calculated by the following equation.

$$PTS(n)=DTS(n)+\text{dts\_pts\_offset}(n)/\text{timescale} \qquad (2)$$

wherein dts_pts_offset(n) represents a difference value between a decode time and a presentation time of an nth access unit in an MPU.

The transmitter 100 transmits each piece of information so as to be received by the receiver 200 before a start of decoding of an MPU in the receiver 200 so that the receiver 200 can calculate a DTS and a PTS using equation (1) and equation (2).

Next, operations of the transmitter 100 and the receiver 200 in the example embodiment of the present invention will be described. Initially, operations of the transmitter 100 and the receiver 200 upon inserting a leap second in order to cause Coordinated Universal Time to be close to Universal Time are described below.

Figure 6:
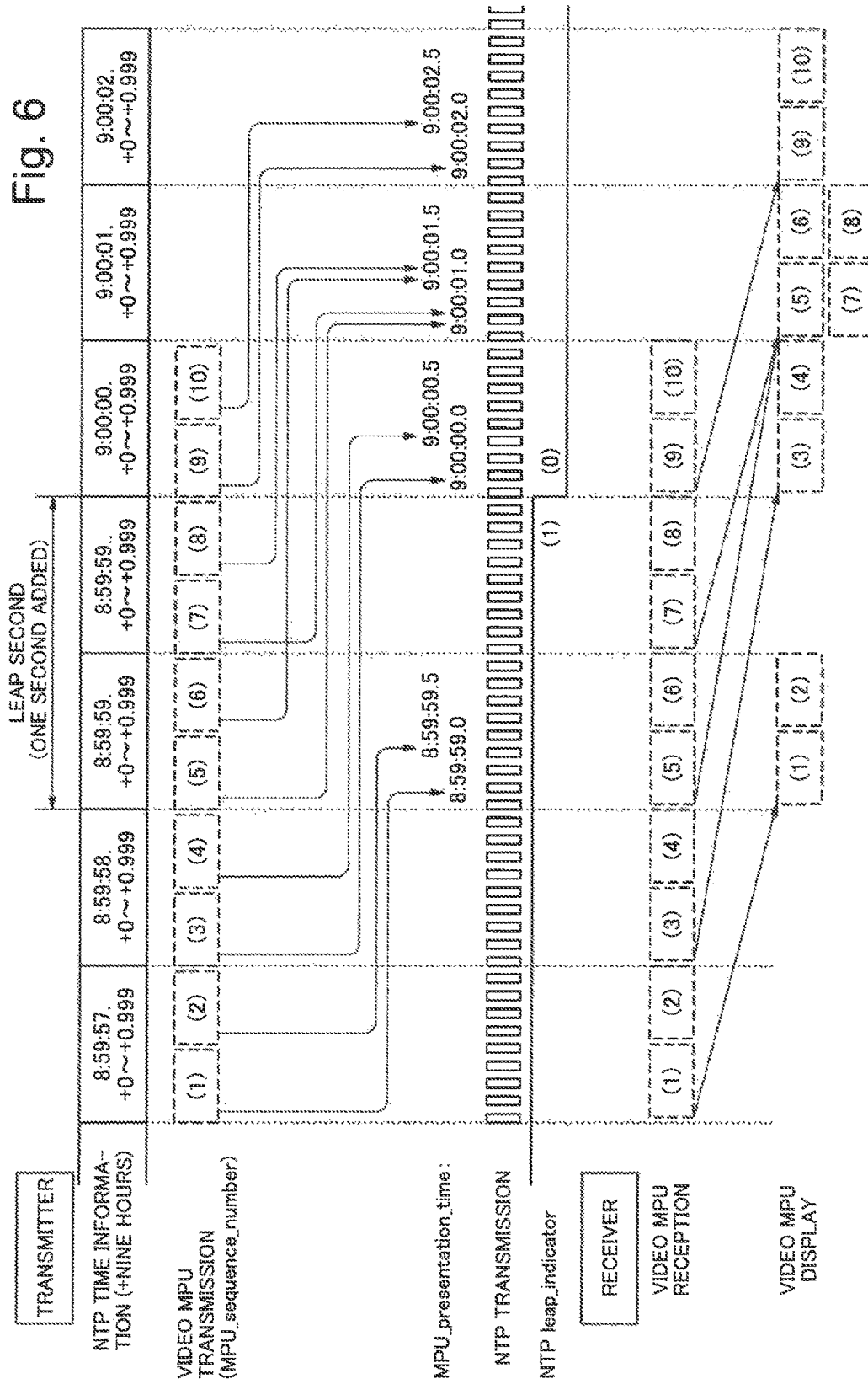
FIG. 6 is an illustrative diagram illustrating an example of MPUs transmitted/received when a leap second is inserted.

FIG. 6 is an illustrative diagram illustrating an example of MPUs transmitted/received when a leap second is inserted.

In the present example, it is assumed that the respective MPUs are sequentially transmitted at intervals of 0.5 seconds. Then, in the example illustrated in FIG. 6, at 8:59:57.0, respective MMTP packets of an MPU in which a value indicated by mpu_sequence_number information (indicated as MPU_sequence_number in FIG. 6) is "1" are transmitted. Further, at 8:59:57.5, respective MMTP packets of an MPU in which a value indicated by mpu_sequence_number information is "2" are transmitted. At 8:59:58. 0, respective MMTP packets of an MPU in which a value indicated by mpu_sequence_number information is "3" are transmitted. Further, at 8:59:58. 5, respective MMTP packets of an MPU in which a value indicated by mpu_sequence_number information is "4" are transmitted. At 8:59:59. 0 of a first time, respective MMTP packets of an MPU in which a value indicated by mpu_sequence_number information is "5" are transmitted. Further, at 8:59:59. 5 of a first time, respective MMTP packets of an MPU in which a value indicated by mpu_sequence_number information is "6" are transmitted. At 8:59:59. 0 of a second time, respective MMTP packets of an MPU in which a value indicated by mpu_sequence_number information is "7" are transmitted. Further, at 8:59:59. 5 of a second time, respective MMTP packets of an MPU in which a value indicated by mpu_sequence_number information is "8" are transmitted. At 9:00:00. 0, respective MMTP packets of an MPU in which a value indicated by mpu_sequence_number information is "9" are transmitted. Further, at 9:00:00. 5, respective MMTP packets of an MPU in which a value indicated by mpu_sequence_number information is "10" are transmitted.

Here, it is assumed that a value in accordance with a presentation time indicated by MPU_presentation_time information indicates a value in accordance with a time after two seconds from a transmission time.

Then, in the example illustrated in FIG. 6, a presentation time in accordance with a value indicated by MPU_presentation_time information of MMTP packets of an MPU in which a value indicated by mpu_sequence_number information is "1" is 8:59:59. 0. Further, a presentation time in accordance with a value indicated by MPU_presentation_time information of MMTP packets of an MPU in which a value indicated by mpu_sequence_number information is "2" is 8:59:59. 5. A presentation time in accordance with a value indicated by MPU_presentation_time information of MMTP packets of an MPU in which a value indicated by mpu_sequence_number information is "3" is 9:00:00. 0. Further, a presentation time in accordance with a value indicated by MPU_presentation_time information of MMTP packets of an MPU in which a value indicated by mpu_sequence_number information is "4" is 9:00:00. 5. A presentation time in accordance with a value indicated by MPU_presentation_time information of MMTP packets of an MPU in which a value indicated by mpu_sequence_number information is "5" is 9:00:01. 0. Further, a presentation time in accordance with a value indicated by MPU_presentation_time information of MMTP packets of an MPU in which a value indicated by mpu_sequence_number information is "6" is 9:00:01. 5. A presentation time in accordance with a value indicated by MPU_presentation_time information of MMTP packets of an MPU in which a value indicated by mpu_sequence_number information is "7" is 9:00:01. 0. Further, a presentation time in accordance with a value indicated by MPU_presentation_time information of MMTP packets of an MPU in which a value indicated by mpu_sequence_number information is "8" is 9:00:01. 5. A presentation time in accordance with a value indicated by MPU_presentation_time information of MMTP packets of an MPU in which a value indicated by mpu_sequence_number information is "9" is 9:00:02. 0. Further, a presentation time in accordance with a value indicated by MPU_presentation_time information of MMTP packets of an MPU in which a value indicated by mpu_sequence_number information is "10" is 9:00:02. 5.

Therefore, with respect to the MMTP packets of the MPU in which a value indicated by mpu_sequence_number information is "5" and the MMTP packets of the MPU in which a value indicated by mpu_sequence_number information is "7," each of the presentation times in accordance with a value indicated by MPU_presentation_time information is 9:00:01. 0. Therefore, there are two MPUs in which a presentation time in accordance with a value indicated by MPU_presentation_time information is 9:00:01. 0.

Further, with respect to the MMTP packets of the MPU in which a value indicated by mpu_sequence_number information is "6" and the MMTP packets of the MPU in which a value indicated by mpu_sequence_number information is "8," each of the presentation times in accordance with a value indicated by MPU_presentation_time information is 9:00:01. 5. Therefore, there are two MPUs in which a presentation time in accordance with a value indicated by MPU_presentation_time information is 9:00:01. 5.

In contrast, due to insertion of 8:59:59 as a leap second, while processing from 8:59:59. 0 to 8:59:59. 999 has been repeated twice, there are only two MPUs in which a presentation time in accordance with a value indicated by MPU_presentation_time information is a time between 8:59:59. 0 and 8:59:59. 999. Then, there is no MPU used for presentation between 8:59:59. 0 and 8:59:59. 999 of a second time.

In other words, when processing timings of MPUs used for presentation are determined on the basis of set MPU_presentation_time information, a problem may occur upon inserting a leap second, and it is not possible for the invention described in Patent Literature 1 to solve such a problem.

Figure 7:
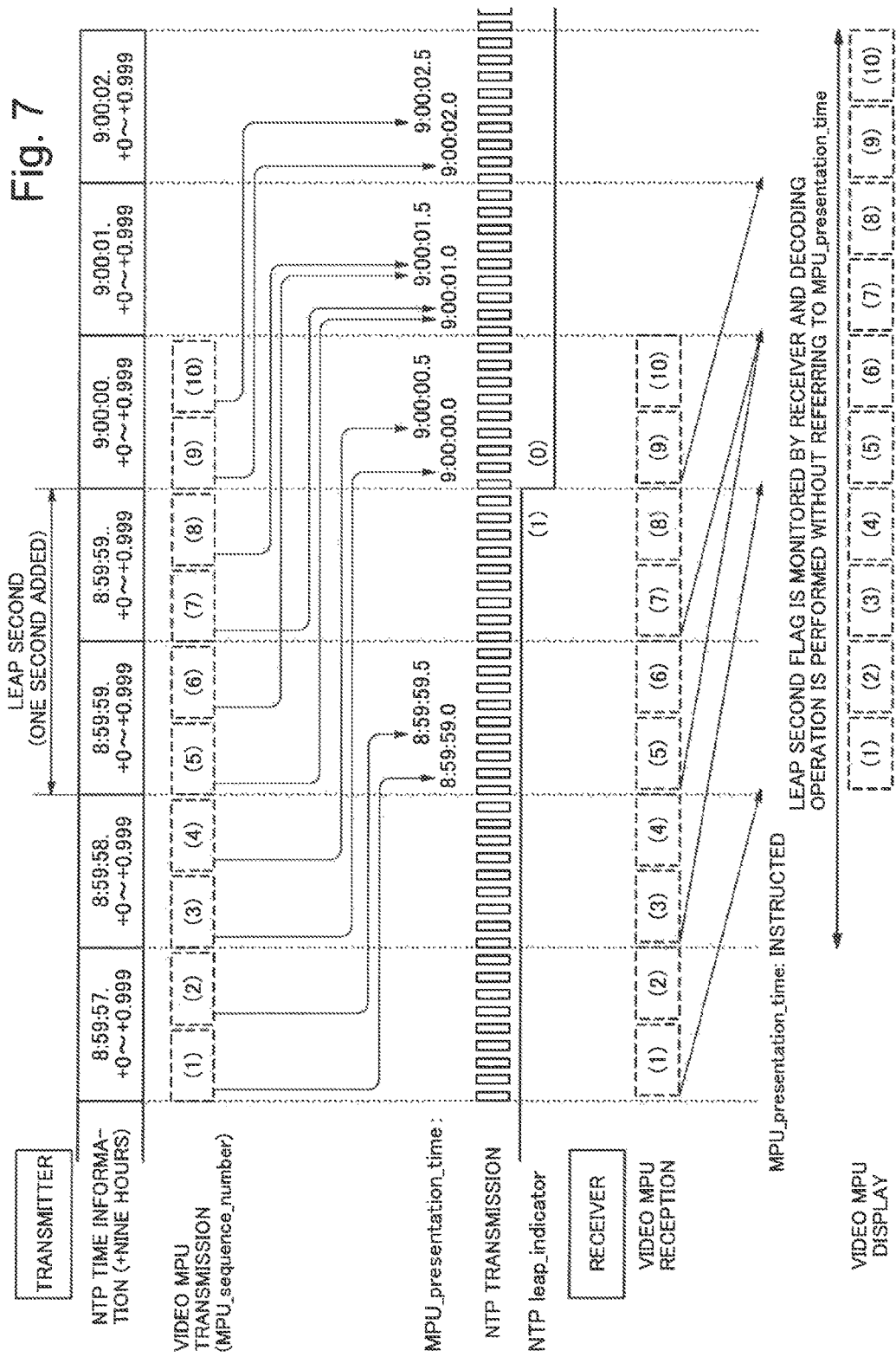
FIG. 7 is an illustrative diagram illustrating an example in which a receiver processes MPUs transmitted/received when a leap second is inserted.
Figure 8:
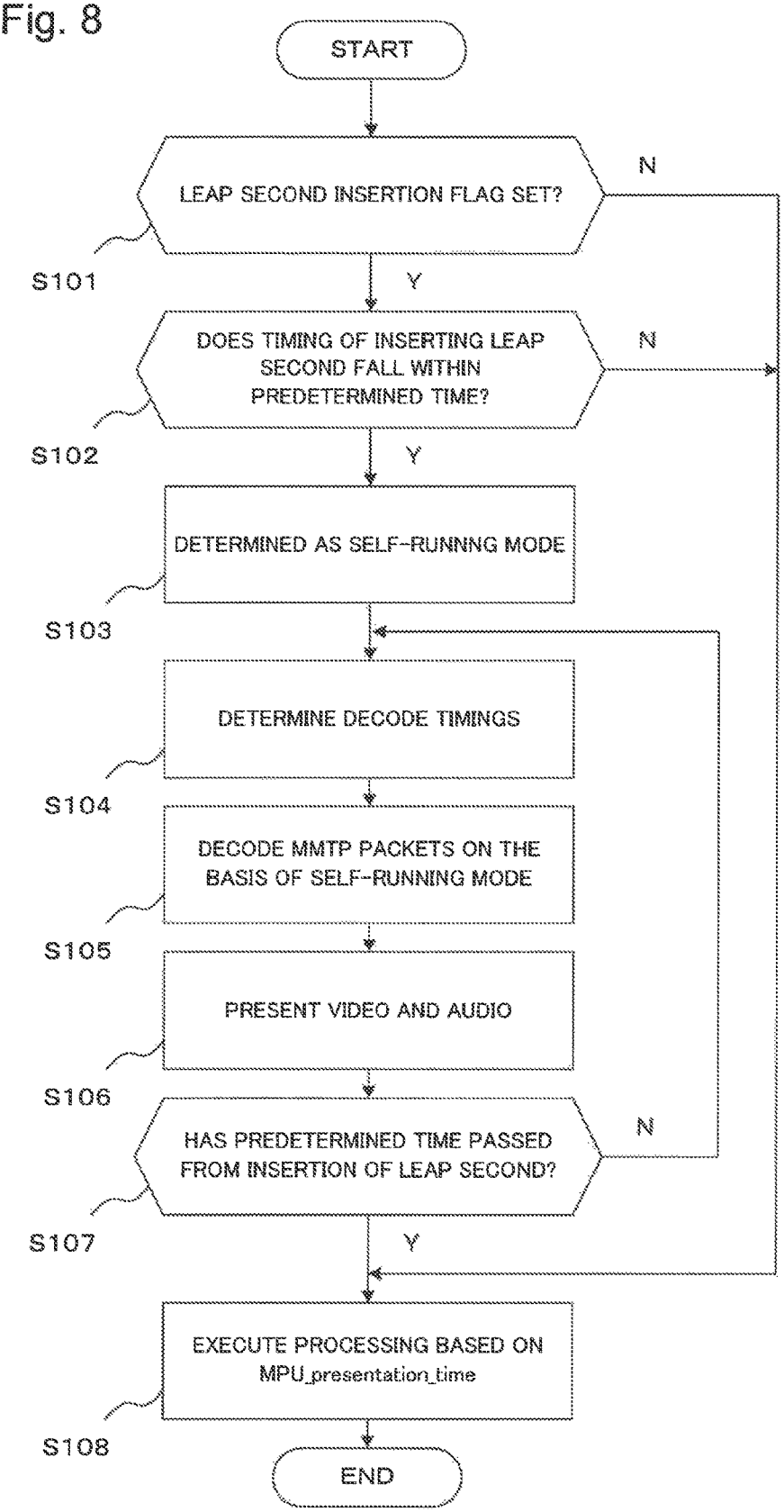
FIG. 8 is a flowchart illustrating an example in which a receiver processes MPUs transmitted/received when a leap second is inserted.

FIG. 7 is an illustrative diagram illustrating an example in which the receiver 200 processes MPUs transmitted/received when a leap second is inserted. FIG. 8 is a flowchart illustrating an example in which the receiver 200 processes MPUs transmitted/received when a leap second is inserted.

In the example illustrated in FIG. 7, MMTP packets of MPUs in which values indicated by mpu_sequence_number information are 1 to 10 are transmitted. When a leap second insertion flag is set for time information included in the MMTP packets (Y of step S101) and a timing of inserting a leap second falls within a predetermined time (Y of step S102), the receiver 200 moves to processing of step S103, and when the above case is not realized (N of step S101 or N of step S102), the receiver 200 moves to processing of step S108. In the processing of step S108, the receiver 200 executes normal processing that processes MMTP packets used for presentation at timings based on MPU_presentation_time information (step S108).

Specifically, in the processing of step S108, the receiver 200 decodes and presents the respective MMTP packets at timings based on calculation results using equation (1) and equation (2) described above on the basis of the MPU_presentation_time information.

Further, the receiver 200 determines to execute processing such as decoding and the like on the basis of timings determined in a self-running mode in processing of step S103 (step S103).

Here, the leap second insertion flag is indicated as NTP leap_indicator in FIGS. 6 and 7 and it is reset at 9:00:00. 0. Specifically, for example, a leap second insertion flag is set for time information included in MMTP packets transmitted before 9:00:00. 0, but no leap second insertion flag is set for time information included in MMTP packets transmitted after 9:00:00. 0.

Hereinafter, the self-running mode is described. The self-running mode refers to a mode in which the receiver 200 determines timings of decoding MMTP packets of each MPU without referring to MPU_presentation_time information.

The receiver 200 determines timings of decoding the MMTP packets by the following processing in the self-running mode (step S104). Specifically, the receiver 200 sequentially determines, at intervals in accordance with a value of pts_offset used in the calculation of equation (1) in the processing of step S108 of an immediately prior stage, timings of decoding subsequent access units. More specifically, timings of decoding respective MMTP packets configuring the access units are determined so as to decode MMPT packets configuring the access units at time intervals of a value of pts_offset, for example.

Then, the receiver 200 decodes the respective MMTP packets configuring the access units on the basis of the timings determined in the processing of step S104 (step S105). The unit of decoding may be an access unit or another unit.

The receiver 200 presents video and audio based on the MMTP packets decoded in the processing of step S105 (step S106). Specifically, at intervals in accordance with the value of pts_offset used in the calculation of equation (1) in the processing of step S108 of an immediately prior stage, timings of presenting video and audio in accordance with subsequent access units are sequentially determined. More specifically, timings of presenting video and audio in accordance with respective MMTP packets configuring the access units are determined so as to present video and audio in accordance with MMTP packets configuring the access units at time intervals of a value of pts_offset, for example. Then, the receiver 200 presents the video and audio at the determined timings.

When a predetermined time has not passed from insertion of a leap second (N of step S107), the receiver 200 moves to the processing of step S104.

Then, by repeating the processing of steps S104 to S106, the MMTP packets configuring the respective access units are decoded at timings in accordance with the value of pts_offset in an order of sequence numbers indicated by mpu_sequence_number information, as illustrated in the lower side of FIG. 7. Then, video and the like based on the respective MMTP packets are sequentially presented.

It should be noted that in general, in a series of MPUs, a value of pts_offset is not changed. Therefore, when on the basis of a calculation result in processing of step S108 of the last time and a value of pts_offset used in the calculation, MMTP packets of access units from the next time are used to determine decode timings, it is possible that the respective MMTP packets are decoded at appropriate timings and video and the like based on the MMTP packets are sequentially presented.

When the predetermined time has passed from insertion of the leap second (Y of step S107), the receiver 200 moves to normal processing for determining timings of MMTP packets used for presentation on the basis of MPU_presentation_time information (step S108).

The determination in the processing of step S107 may be performed on the basis of whether a predetermined time has passed from a time of setting no leap second insertion flag.

Here, "the predetermined time" in the processing of steps S102 and S107 is, for example, three seconds. Therefore, the processing of steps S104 to S106 is repeated over three seconds each before and after a timing of inserting a leap second. Specifically, the processing of steps S104 to S106 is repeated, for example, from 8:59:57 that is three seconds before 9:00:00 when a leap second is inserted to 9:00:03 that is three seconds after 9:00:00 when the leap second has been inserted.

Therefore, in the present example, the receiver 200 executes processing based on the self-running mode over three seconds before and after a timing of inserting a leap second and executes normal processing of step S108 for a period other than the above. It should be noted that the time and the number of seconds used for the description in the present example are illustrative, and another time and another number of seconds may be used.

Figure 9:
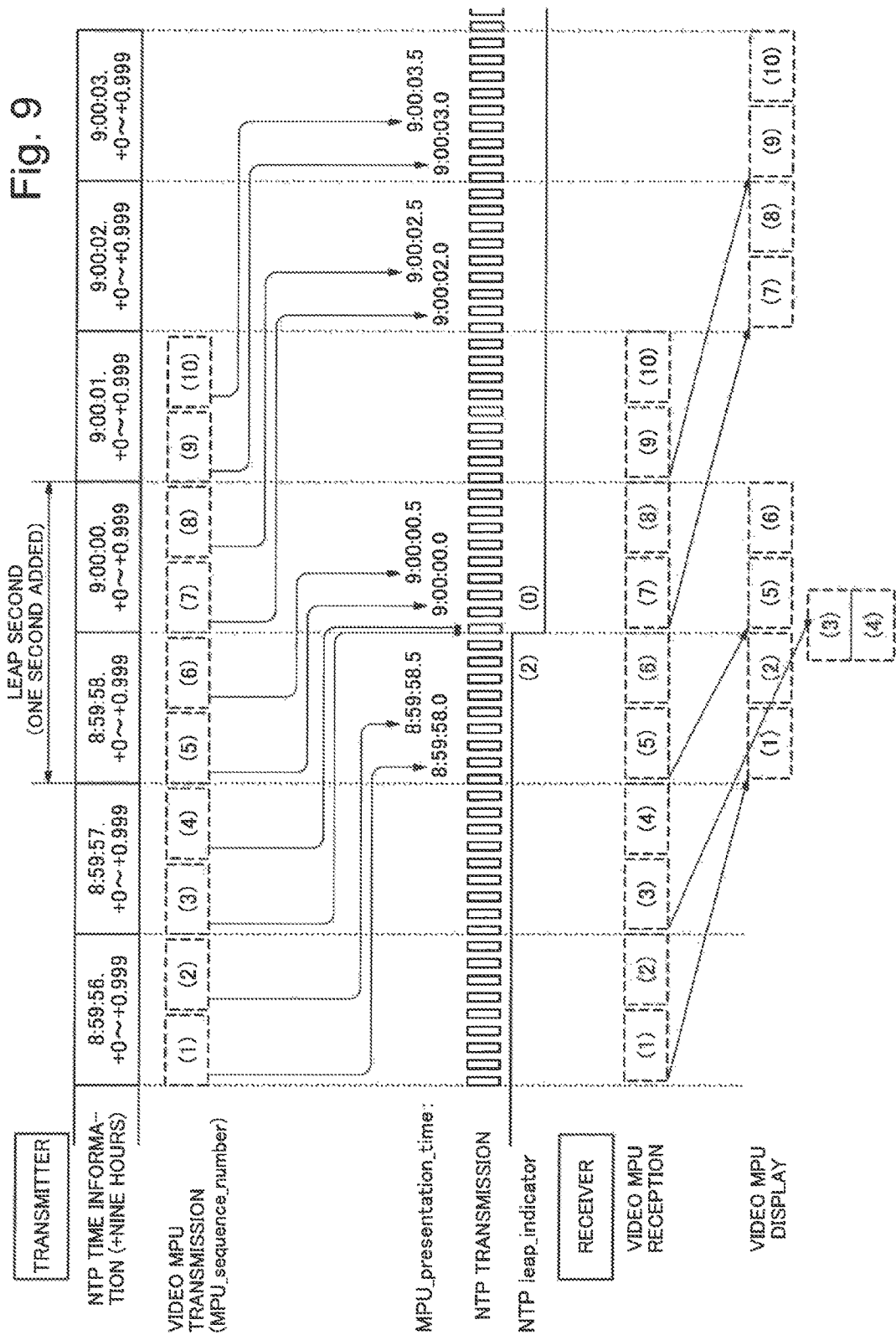
FIG. 9 is an illustrative diagram illustrating an example of MPUs transmitted/received when a leap second is eliminated.

Next, operations of the transmitter 100 and the receiver 200 upon eliminating a leap second to cause Coordinated Universal Time to be close to Universal Time will be described. FIG. 9 is an illustrative diagram illustrating an example of MPUs transmitted/received when a leap second is eliminated.

In the example illustrated in FIG. 9, it is assumed that respective MPUs are sequentially transmitted at intervals of 0.5 seconds. Then, in the example illustrated in FIG. 9, at 8:59:56. 0, respective MMTP packets of an MPU in which a value indicated by mpu_sequence_number information is "1" are transmitted. Further, at 8:59:56. 5, respective MMTP packets of an MPU in which a value indicated by mpu_sequence_number information is "2" are transmitted. At 8:59:57. 0, respective MMTP packets of an MPU in which a value indicated by mpu_sequence_number information is "3" are transmitted. Further, at 8:59:57. 5, respective MMTP packets of an MPU in which a value indicated by mpu_sequence_number information is "4" are transmitted. At 8:59:58. 0, respective MMTP packets of an MPU in which a value indicated by mpu_sequence_number information is "5" are transmitted. Further, at 8:59:58. 5, respective MMTP packets of an MPU in which a value indicated by mpu_sequence_number information is "6" are transmitted. At 9:00:00. 0, respective MMTP packets of an MPU in which a value indicated by mpu_sequence_number information is "7" are transmitted. Further, at 9:00:00. 5, respective MMTP packets of an MPU in which a value indicated by mpu_sequence_number information is "8" are transmitted. At 9:00:01. 0, respective MMTP packets of an MPU in which a value indicated by mpu_sequence_number information is "9" are transmitted. Further, at 9:00:01. 5, respective MMTP packets of an MPU in which a value indicated by mpu_sequence_number information is "10" are transmitted.

It is assumed that a value in accordance with a presentation time indicated by MPU_presentation_time information indicates a value in accordance with a time after two seconds from a transmission time.

Then, in the example illustrated in FIG. 9, a presentation time in accordance with a value indicated by MPU_presentation_time information of MMTP packets of an MPU in which a value indicated by mpu_sequence_number information is "1" is 8:59:58. 0. Further, a presentation time in accordance with a value indicated by MPU_presentation_time information of MMTP packets of an MPU in which a value indicated by mpu_sequence_number information is "2" is 8:59:58. 5. A presentation time in accordance with a value indicated by MPU_presentation_time information of MMTP packets of an MPU in which a value indicated by mpu_sequence_number information is "3" is 8:59:59. 0. Further, a presentation time in accordance with a value indicated by MPU_presentation_time information of MMTP packets of an MPU in which a value indicated by mpu_sequence_number information is "4" is 8:59:59. 5. A presentation time in accordance with a value indicated by MPU_presentation_time information of MMTP packets of an MPU in which a value indicated by mpu_sequence_number information is "5" is 9:00:00. 0. Further, a presentation time in accordance with a value indicated by MPU_presentation_time information of MMTP packets of an MPU in which a value indicated by mpu_sequence_number information is "6" is 9:00:00. 5. A presentation time in accordance with a value indicated by MPU_presentation_time information of MMTP packets of an MPU in which a value indicated by mpu_sequence_number information is "7" is 9:00:02. 0. Further, a presentation time in accordance with a value indicated by MPU_presentation_time information of MMTP packets of an MPU in which a value indicated by mpu_sequence_number information is "8" is 9:00:02. 5. A presentation time in accordance with a value indicated by MPU_presentation_time information of MMTP packets of an MPU in which a value indicated by mpu_sequence_number information is "9" is 9:00:03. 0. Further, a presentation time in accordance with a value indicated by MPU_presentation_time information of MMTP packets of an MPU in which a value indicated by mpu_sequence_number information is "10" is 9:00:03. 5.

Therefore, there is not either 8:59:59. 0 that is a presentation time in accordance with the value indicated by the MPU_presentation_time information of the MMTP packets of the MPU in which a value indicated by mpu_sequence_number information is "3" or 8:59:59. 5 that is a presentation time in accordance with the value indicated by the MPU_presentation_time information of the MMTP packets of the MPU in which a value indicated by mpu_sequence_number information is "4." In other words, there is not presented either video and the like in accordance with the MMTP packets of the MPU in which a value indicated by mpu_sequence_number information is "3" or video and the like in accordance with the MMTP packets of the MPU in which a value indicated by mpu_sequence_number information is "4."

Further, there is not either an MPU in which a presentation time in accordance with a value indicated by MPU_presentation_time information is 9:00:01. 0 or an MPU in which a presentation time in accordance with a value indicated by MPU_presentation_time information is 9:00:01. 5.

In other words, when processing timings of MPUs used for presentation are determined on the basis of set MPU_presentation_time information, a problem may occur upon eliminating a leap second. It is difficult for the invention described in Patent Literature 1 to solve such a problem.

Figure 10:
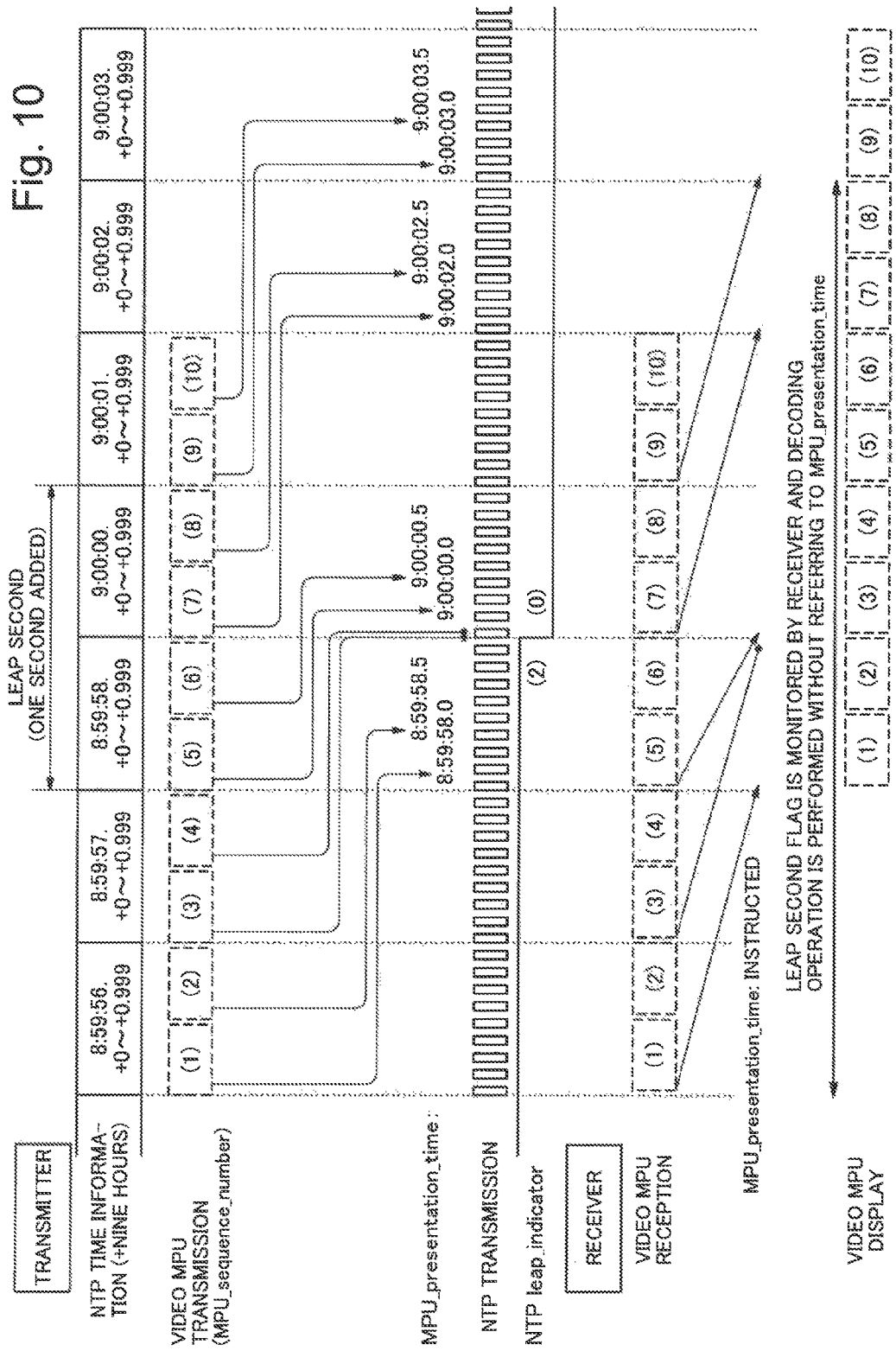
FIG. 10 is an illustrative diagram illustrating an example in which a receiver processes MPUs transmitted/received when a leap second is eliminated.
Figure 11:
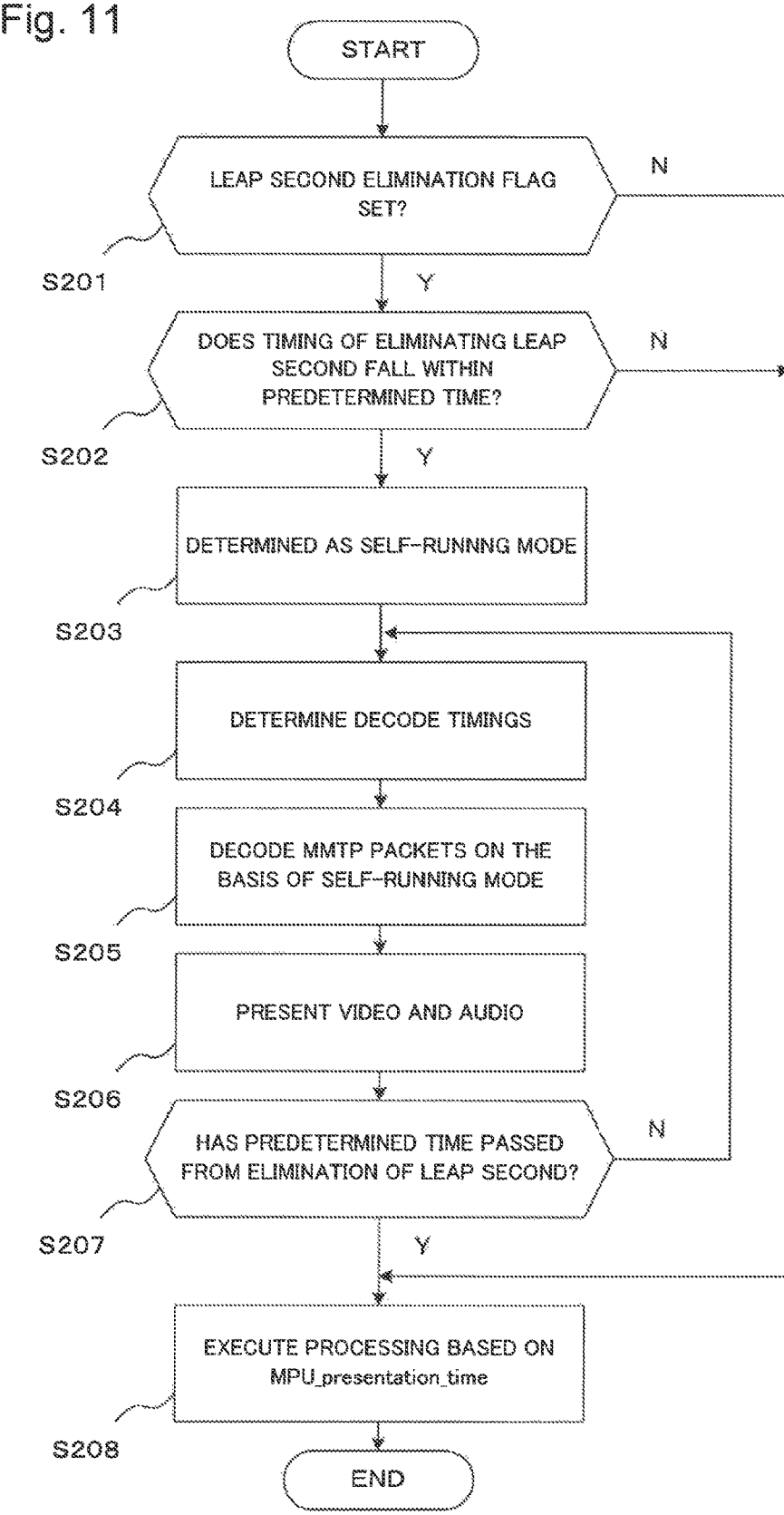
FIG. 11 is a flowchart illustrating an example in which a receiver processes MPUs transmitted/received when a leap second is eliminated.

FIG. 10 is an illustrative diagram illustrating an example in which the receiver 200 processes MPUs transmitted/received when a leap second is eliminated. FIG. 11 is a flowchart illustrating an example in which the receiver 200 processes MPUs transmitted/received when a leap second is eliminated.

In the example illustrated in FIG. 10, at the same timings as in the example illustrated in FIG. 9, MMTP packets of MPUs in which values indicated by mpu_sequence_number information are 1 to 10 are transmitted. Then, when a leap second elimination flag is set for time information included in the MMTP packets (Y of step S201) and a timing of eliminating a leap second falls within a predetermined time (Y of step S202), the receiver 200 moves to processing of step S203, and when the above case is not realized (N of step S201 or N of step S202), the receiver 200 moves to processing of step S208. In the processing of step S208, the receiver 200 executes normal processing that processes MMTP packets used for presentation at timings based on MPU_presentation_time information (step S208).

Specifically, in the processing of step S208, the receiver 200 decodes and presents the respective MMTP packets at timings based on calculating results using equation (1) and equation (2) described above, on the basis of the MPU_presentatation_time information.

Further, the receiver 200 determines to execute processing such as decoding and the like on the basis of timings determined in the self-running mode in processing of step S203 (step S203).

Here, the leap second elimination flag is indicated as NTP leap_indicator in FIGS. 9 and 10 and it is reset at 9:00:00. 0. Specifically, for example, a leap second elimination flag is set for time information included in MMTP packets transmitted before 9:00:00. 0, but no leap second elimination flag is set for time information included in MMTP packets transmitted after 9:00:00. 0.

Then, the receiver 200 determines timings of decoding MMTP packets by the following processing in the self-running mode (step S204). In other words, the receiver 200 sequentially determines, at intervals in accordance with the value of pts_offset used in the calculation of equation (1) in processing of step S208 of an immediately prior stage, timings of decoding subsequent access units. More specifically, timings of decoding respective MMTP packets configuring the access units are determined so as to decode MMPT packets configuring the access units at time intervals of a value of pts_offset, for example.

Then, the receiver 200 decodes the MMTP packets configuring the respective access units on the basis of the timings determined in the processing of step S204 (step S205).

The receiver 200 presents video and audio based on the MMTP packets decoded in the processing of step S205 (step S206). Specifically, at intervals in accordance with the value of pts_offset used in the calculation of equation (1) in the processing of step S208 of an immediately prior stage, timings of presenting video and audio in accordance with subsequent access units are sequentially determined. More specifically, timings of presenting video and audio in accordance with the respective MMTP packets configuring the access units are determined so as to present video and audio in accordance with MMTP packets configuring the access units at time intervals of a value of pts_offset, for example. The receiver 200 presents the video and audio at the determined timings.

When a predetermined time has not passed from elimination of a leap second (N of step S207), the receiver 200 moves to the processing of step S204.

Then, by repeating the processing of steps S204 to S206, the MMTP packets configuring the respective access units are decoded at timings in accordance with the value of pts_offset in an order of sequence numbers indicated by mpu_sequence_number information, as illustrated in the lower side of FIG. 10. Then, video and the like based on the respective MMTP packets are sequentially presented.

It should be noted that as described above, in general, in a series of MPUs, a value of pts_offset is not changed. Therefore, when on the basis of a calculation result in processing of step S208 of the last time and a value of pts_offset used in the calculation, MMTP packets of access units from the next time are used to determine decode timings, it is possible that the respective MMTP packets are decoded at appropriate timings and video and the like based on the MMTP packets are sequentially presented.

When the predetermined time has passed from elimination of the leap second (Y of step S207), the receiver 200 moves to normal processing for determining timings of MMTP packets used for presentation on the basis of MPU_presentation_time information (step S208).

The determination in the processing of step S207 may be performed on the basis of whether a predetermined time has passed from a time of setting no leap second elimination flag.

Here, "the predetermined time" in the processing of steps S202 and S207 is, for example, three seconds. Therefore, the processing of steps S204 to S206 is repeated over three seconds each before and after a timing of eliminating a leap second. Specifically, the processing of steps S204 to S206 is repeated, for example, from 8:59:56 that is three seconds before 8:59:59 that is eliminated as a leap second to 9:00:03 that is three seconds after 8:59:59 that has been eliminated as the leap second.

Therefore, in the present example, the receiver 200 executes processing based on the self-running mode over three seconds before and after a timing of eliminating a leap second and executes normal processing of step S208 for a period other than the above. It should be noted that the time and the number of seconds used for the description in the present example are illustrative, and another time and another number of seconds may be used.

According to the present example embodiment, the receiver 200 processes MMTP packets in the self-running mode for a period in accordance with a timing of inserting a leap second and for a period in accordance with a timing of eliminating a leap second. Therefore, a problem caused due to insertion or elimination of a leap second can be prevented from occurring.

Specifically, when a calculation result in calculation processing of the last time using equation (1) and equation (2) and a value of pts_offset used in the calculation is used to determine timings of processing from the next time for a period in accordance with a timing of inserting a leap second and for a period in accordance with a timing of eliminating a leap second, it is possible that respective MMTP packets are decoded at appropriate timings and video and the like based on the MMTP packets are sequentially presented. Respective MMTP packets are decoded at appropriate timings and video and the like based on the MMTP packets are sequentially presented, and therefore it is possible that respective MMTP packets are decoded in an appropriate order and video and the like based on the MMTP packets are sequentially presented.

Further, even when the receiver 200 has received packets in accordance with television program information and the like transmitted via a communication line and packets in accordance with television program information and the like transmitted by radio waves, decoding can be performed in an appropriate order and at appropriate timings in accordance with a presentation order of the television program information and the like.

Furthermore, even when the receiver 200 has received packets in accordance with television program information and the like transmitted via a communication line in an order different from an order of a transmission order, decoding can be performed in an appropriate order and at appropriate timings in accordance with a presentation order of the television program information and the like.

A Second Example Embodiment

Figure 12:
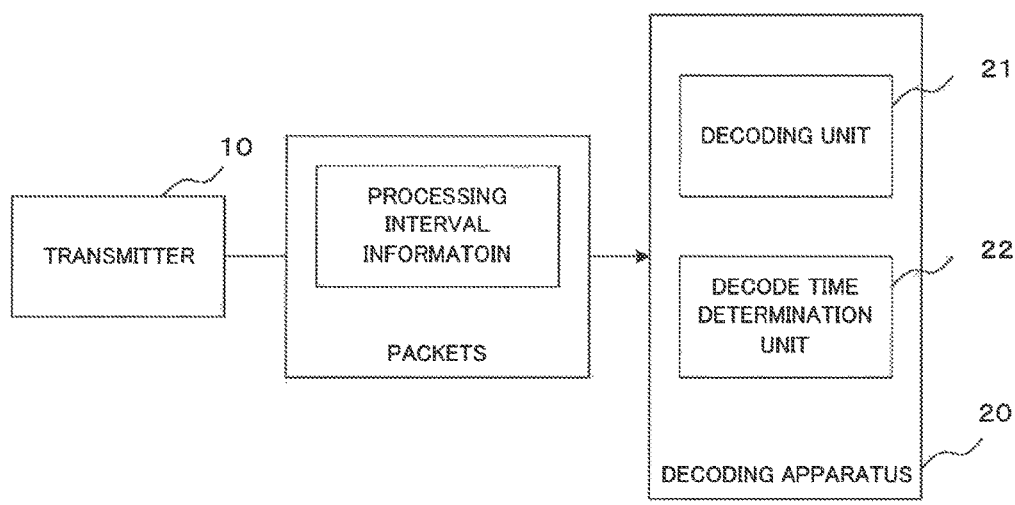
FIG. 12 is a block diagram illustrating a configuration example of a decoding apparatus of a second example embodiment of the present invention.

Next, a decoding apparatus 20 of a second example embodiment of the present invention will be described with reference to the accompanying drawings. FIG. 12 is a block diagram illustrating a configuration example of the decoding apparatus 20 of the second example embodiment of the present invention. As illustrated in FIG. 12, the decoding apparatus 20 of the second example embodiment of the present invention includes a decoding unit 21 and a decode time determination unit 22.

The decoding unit 21 decodes packets transmitted from a transmitter 10 (equivalent to the transmitter 100 in the first example embodiment illustrated in FIG. 1).

The decode time determination unit 22 determines timings of decoding the packets by the decoding unit 21 on the basis of adjustment information in accordance with adjustment of times for causing Coordinated Universal Time to be close to Universal Time, the times being included in the packets.

The packets include processing interval information that indicates a processing interval of access units that are sets including own packets, and the decode time determination unit 22 determines to sequentially decode the packets configuring the respective access units at intervals in accordance with the interval indicated by the processing interval information when the adjustment information indicates that the times are adjusted.

According to the present example embodiment, pieces of information sequentially transmitted can be decoded and reproduced at appropriate timings.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-040456, filed on Ma. 2, 2015, the disclosure of which is incorporated herein in its entirety by reference.

REFERENCE SIGNS LIST 10, 100 transmitter
20 decoding apparatus
21 decoding unit
22 decode time determination unit
200 receiver
300, 500 antenna
400 communication line
600a, 600b multimedia information

The invention claimed is:

1. A decoding apparatus comprising:
a decoder configured for decoding packets transmitted from a transmitter; and
a decode time determination unit which is implemented by a central processing unit (CPU) and configured for determining timings of decoding the packets by the decoder on the basis of adjustment information in accordance with adjustment of times for causing Coordinated Universal Time to be close to Universal Time, the times being included in the packets,
wherein the packets include processing timing information that indicates processing timing of access units that are sets including own packets, and
wherein the decode time determination unit is further configured to determine to sequentially decode the packets configuring the respective access units in accordance with relative timing based on the processing timing indicated by the processing timing information when the adjustment information indicates that the times are adjusted.

2. The decoding apparatus according to claim 1, wherein the decode time determination unit is further configured to determine to sequentially decode the packets configuring the respective access units in accordance with relative timing based on the processing timing indicated by the processing timing information for a predetermined period in accordance with timings of adjusting the times.

3. The decoding apparatus according to claim 2, wherein the packets include presentation time information that indicates times of presenting contents based on the packets configuring the sets including the access units, and
the decode time determination unit is further configured to determine timings of the packets decoded by the decoder on the basis of the presentation time information for a period other than the predetermined period.

4. The decoding apparatus according to claim 1, wherein the adjustment information is information that indicates insertion or elimination of a leap second.

5. A receiver comprising:
the decoding apparatus according to claim 1; and a reception apparatus that receives the packets.

6. A transmission/reception system comprising:
the receiver according to claim 5; and
a transmitter configured for transmitting packets including adjustment information in accordance with adjustment of times for causing Coordinated Universal Time to be close to Universal Time and processing timing information that indicates a processing timing of access units that are sets including own packets in order to decode packets in accordance with contents at predetermined timings.

7. A decoding method comprising:
decoding packets transmitted from a transmitter; and
determining timings of decoding the packets on the basis of adjustment information in accordance with adjustment of times for causing Coordinated Universal Time to be close to Universal Time, the times being included in the packets,
wherein the packets include processing timing information that indicates processing timing of access units that are sets including own packets, and
wherein the packets configuring the respective access units are determined to be sequentially decoded in accordance with relative timing based on the processing timing indicated by the processing timing information when the adjustment information indicates that the times are adjusted.

* * * * *